United States Patent
Shimamura

(10) Patent No.: US 8,743,419 B2
(45) Date of Patent: Jun. 3, 2014

(54) IMAGE PROCESSING APPARATUS AND METHOD CONVERTING LOW-RESOLUTION IMAGE TO HIGH-RESOLUTION USING SIGNAL VALUE PATTERNS

(71) Applicant: Canon Kabushiki Kaisha, Tokyo (JP)

(72) Inventor: Koya Shimamura, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 51 days.

(21) Appl. No.: 13/653,154

(22) Filed: Oct. 16, 2012

(65) Prior Publication Data
US 2013/0120802 A1    May 16, 2013

(30) Foreign Application Priority Data
Nov. 15, 2011    (JP) .................................. 2011-249586

(51) Int. Cl.
*H04N 1/393*    (2006.01)
*G06T 3/40*    (2006.01)

(52) U.S. Cl.
USPC ............ 358/1.2; 358/3.26; 382/269; 382/299

(58) Field of Classification Search
None
See application file for complete search history.

(56) References Cited

U.S. PATENT DOCUMENTS

| 5,650,858 | A | * | 7/1997 | Lund ............................ 358/3.15 |
| 5,875,268 | A | | 2/1999 | Miyake |
| 6,678,426 | B1 | * | 1/2004 | Bearss et al. .................. 382/299 |
| 7,139,442 | B2 | * | 11/2006 | Ebner et al. .................... 382/299 |
| 7,327,904 | B2 | * | 2/2008 | Zhou et al. .................... 382/299 |
| 7,719,481 | B2 | * | 5/2010 | Gormish ........................ 345/2.1 |

FOREIGN PATENT DOCUMENTS

| JP | 06-227048 | | 8/1994 | |
| JP | 07-105359 | | 4/1995 | |
| JP | 2013120951 | A * | 6/2013 | ............. H04N 1/387 |

* cited by examiner

*Primary Examiner* — Scott A Rogers
(74) *Attorney, Agent, or Firm* — Fitzpatrick, Cella, Harper & Scinto

(57) ABSTRACT

Provided is an image processing apparatus and image processing method that make it possible to reduce jaggedness and blurring that may occur when performing resolution conversion of an inputted image from low resolution to high resolution, and make it possible to output a high-resolution image. When performing the conversion from low resolution to high resolution, a multi-gradation signal value pattern that surround a pixel of interest for which interpolation is being performed is acquired. By performing pattern matching, a pattern that corresponds to the acquired signal value pattern is extracted from among pattern files that are prepared in advance for the acquired signal value pattern, after which the image is converted to high resolution by signal value substitution and then outputted.

11 Claims, 14 Drawing Sheets

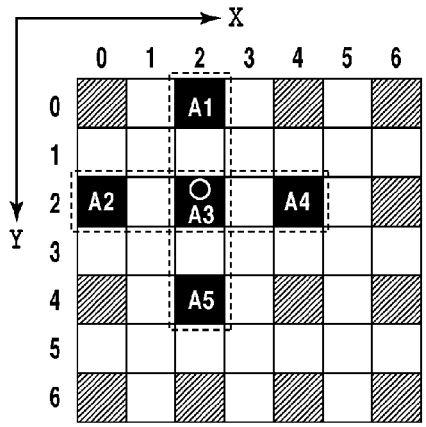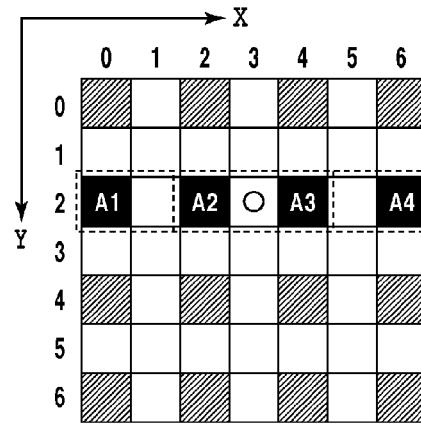
FIG.11A  FIG.11B
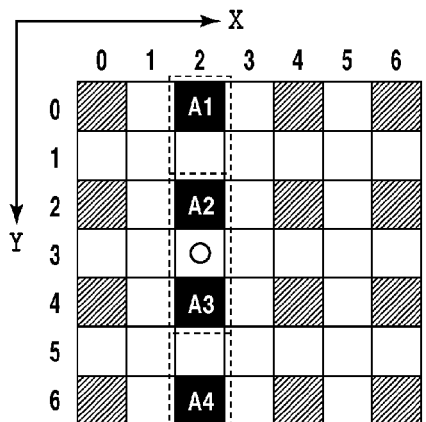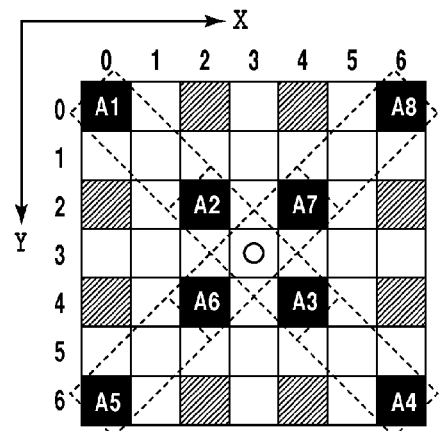
FIG.11C  FIG.11D

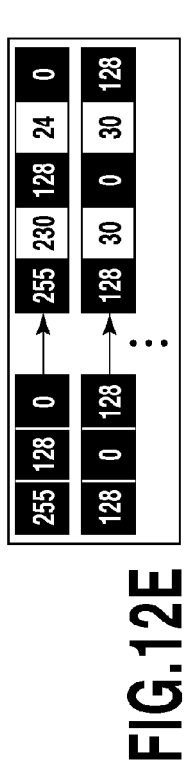
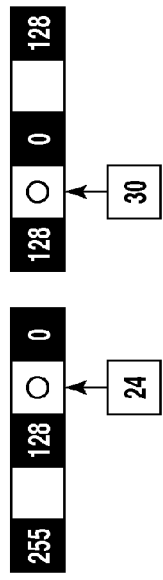
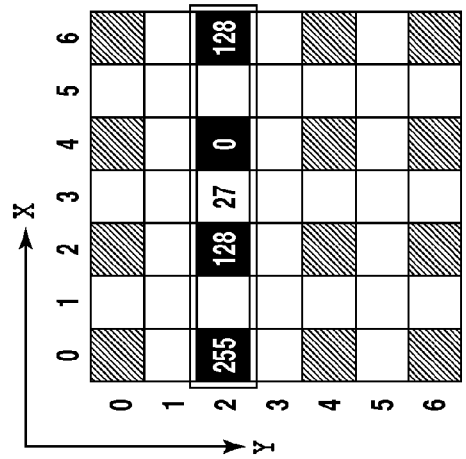
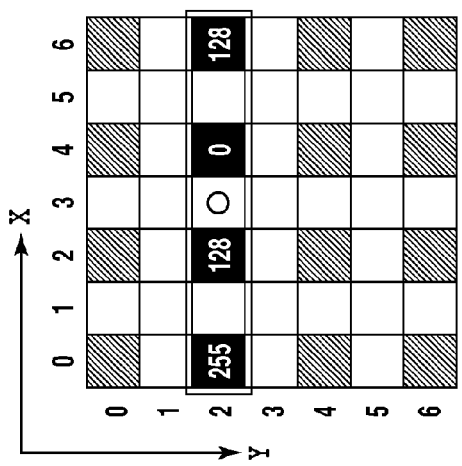
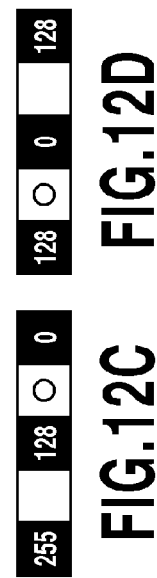
FIG.12A  FIG.12B  FIG.12C  FIG.12D  FIG.12E  FIG.12F  FIG.12G  FIG.12H

IMAGE PROCESSING APPARATUS AND METHOD CONVERTING LOW-RESOLUTION IMAGE TO HIGH-RESOLUTION USING SIGNAL VALUE PATTERNS

BACKGROUND OF THE INVENTION

1. Field of the Invention

The present invention relates to an image processing apparatus and image processing method, and particularly relates to an image processing apparatus and image processing method that are able to convert the resolution of an inputted image from low resolution to high resolution, and output the resulting image.

2. Description of the Related Art

When printing an image, which was acquired from a scanning device such as a scanner at low resolution, at high resolution, it is necessary to convert the resolution of the image from low resolution to high resolution. Moreover, when transferring an image over a network at low resolution in order to reduce the network load, and then displaying or printing that image at high resolution, it is necessary to perform resolution conversion in order to convert the image from low resolution to high resolution.

In the past, many methods have been proposed as methods for converting the resolution of an image that was inputted at low resolution to high resolution. As an interpolation method that is often used when performing resolution conversion on a multi-gradation image, there is a nearest neighbor interpolation method that sets the signal value of the nearest dot from the interpolation point for which interpolation is to be performed as is as the signal value for the interpolation point. Moreover, there is a bi-linear interpolation method that sets the signal value of the interpolation point by a linear equation based on the signal value of a 2×2 pixel (4-pixel) dot around the interpolation point. Furthermore, there is a bi-cubic interpolation method that sets the signal value for the interpolation point by using a cubic polynomial equation from 4×4 pixels (16 pixels) around the interpolation point.

SUMMARY OF THE INVENTION

However, when performing resolution conversion using the above conventional methods, there are the following disadvantages. In the case of the nearest neighbor interpolation method, the algorithm is simple and it is possible to perform processing at high speed, however, as the enlargement rate becomes higher, degraded image quality such as mosaic shaped patterns near the edge sections, or jaggy edges in shaded sections can be seen. Moreover, in the bi-linear interpolation method or the bi-cubic interpolation method, which sets the interpolation point based on the signal values of a plurality of surrounding pixels, the degradation of the image quality such as jaggy edges when compared with the nearest neighbor interpolation method is reduced, however, by averaging the signal values of a plurality of points, the image is smoothed. Therefore, in portions where a sharp image is desired such as edge sections of an image or text, blurring of the image stands out.

In Japanese Patent Laid-Open No. H07-105359(1995), a method is disclosed in which sharp edges are reproduced based on linear interpolation information and edge information according to the size of the edges. However, in this method, resolution conversion is performed based on the size of the edge sections, so in a case where the size of the edges is small, such as in a scanned image, there is a problem in that it is difficult to restore the edges as sharp edges.

In Japanese Patent Laid-Open No. H06-227048(1994), a method is disclosed in which smoothing is performed using pattern matching on outline sections. However, in this method, it is necessary to have a large number of patterns to be used in the pattern matching, so there is a problem in that because of using a pattern having little gradation in order to suppress the memory load, the image after resolution conversion is generated using little gradation.

The object of the present invention is to provide an image processing apparatus and image processing method that are capable of reducing jaggy edges and blurred images that occur when performing resolution conversion from a low-resolution image to a high-resolution image.

The present invention is made to solve the problems described above. The image processing apparatus of the present invention is provided with: a storage unit that associates and stores a signal value pattern of a high-resolution image and a signal value pattern of a low-resolution image that has been converted to low resolution from the high-resolution image; an acquisition unit that, according to a result of matching a signal value pattern of an inputted image with the signal value pattern of the low-resolution image, acquires the signal value pattern of the high-resolution image that is associated with the signal value pattern of the low-resolution image from the storage unit; and a setting unit that, using the signal value pattern that was acquired by the acquisition unit, sets signal values of an image after high-resolution conversion of the inputted image.

With the present invention, it is possible to provide an image processing apparatus and image processing method that are capable of reducing jaggy edges and blurred images that occur when performing resolution conversion from a low-resolution image to a high-resolution image.

Further features of the present invention will become apparent from the following description of exemplary embodiments (with reference to the attached drawings).

BRIEF DESCRIPTION OF THE DRAWINGS

FIGS. 11A to 11D are drawings for explaining in detail the patterns that acquire signal values from the multiple signal value acquisition unit in the second embodiment;

FIGS. 12A to 12H are drawings for explaining in detail the processing by the multiple signal value acquisition unit, pattern matching unit, low/high-resolution pattern association storage unit, interested signal value calculation unit and signal value substitution unit 105 in the second embodiment;

DESCRIPTION OF THE EMBODIMENTS

In the following, embodiments of the present invention will be explained in detail with reference to the drawings. However, the component elements described in the embodiments are only examples, and the scope of the invention is not limited by these.

(First Embodiment)

Figure 1:
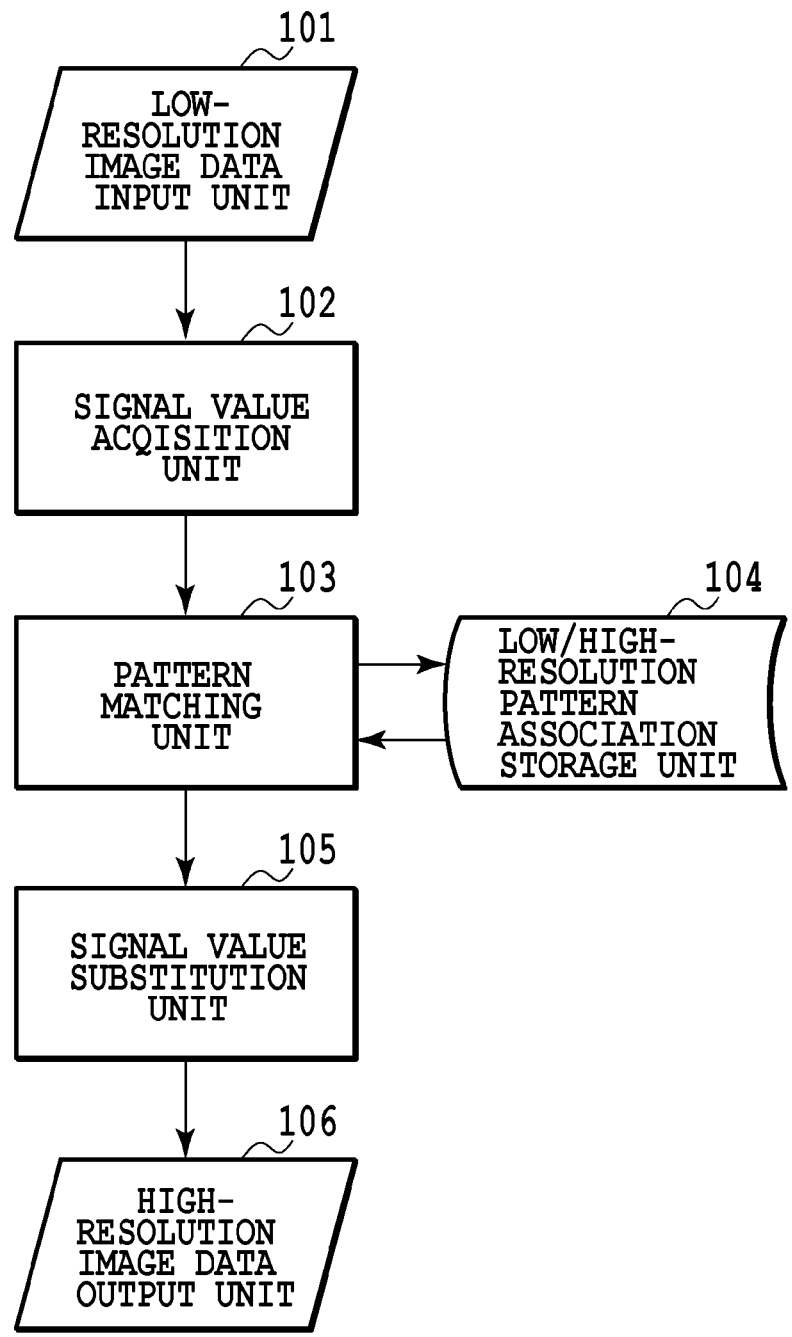
FIG. 1 is block diagram illustrating a schematic configuration of the functions for executing processing of a first embodiment.

FIG. 1 illustrates a schematic configuration of the functions for executing the image processing in a first embodiment of the present invention. The image processing of this embodiment is efficient when used mainly in an image output device of a copying machine, however, this processing can also be applied to image processing apparatuses or applications other than an image output device. The hardware configuration of the image processing apparatus for executing this image processing will be described later.

Referring to FIG. 1, an example of processing that converts the resolution of image data that was inputted to an image processing apparatus by increasing the resolution i times in the horizontal direction and j times in the vertical direction is described.

A low-resolution image data input unit 101 is an input unit for inputting low-resolution image data that will be the object of the resolution conversion process. The low-resolution image data that is inputted by the low-resolution image data input unit 101 is sent to a signal value acquisition unit 102.

A signal value acquisition unit 102 acquires the signal values of respective pixels of the image having N x M pixels in the received low-resolution image as a signal value pattern (N and M are arbitrary natural numbers). More specifically, when performing resolution converting from a low-resolution image to a high-resolution image, the signal value acquisition unit 102 acquires signal values of N×M pixels that surround the pixel of interest that requires interpolation, as the signal value pattern. The signal value pattern acquired by the signal value acquisition unit 102 is sent to a pattern matching unit 103.

The pattern matching unit 103 searches a low/high-resolution pattern association storage unit 104 for a signal value pattern that coincides with the received signal value pattern or a signal value matching pattern that has the same signal value pattern. Then, taking the obtained signal value matching pattern to be a pattern for which the resolution is increased i times in the horizontal direction and j times in the vertical direction, the pattern matching unit 103 acquires from the low/high-resolution pattern association storage unit 104 a multi-gradation signal value substitution pattern that is associated with that signal value matching pattern. In other words, the pattern matching unit 103 acquires a signal value substitution pattern corresponding to the enlargement rate of the resolution conversion.

Here, the signal value substitution pattern is a pattern that expresses signal values for respective pixels of the high-resolution image having a predetermined area. The signal value matching pattern is a pattern that expresses the signal values for respective pixels of a low-resolution image having N×M pixels that were down sampled by 1/i times in the horizontal direction and 1/j times the vertical direction of the high-resolution image having the predetermined area. Signal value substitution patterns and signal value matching patterns before and after down sampling by a plurality of different enlargement rates are associated and stored in the low/high-resolution pattern association storage unit 104. For example, a plurality of signal value substitution patterns having different resolutions are associated with one signal value matching pattern and stored.

The signal value of the pixel of interest in the signal value substitution pattern that was acquired by the pattern matching unit 103 is sent to a signal value substitution unit 105. The signal value substitution unit 105 substitutes the signal value of the pixel requiring interpolation for converting the resolution from the low-resolution image to the high-resolution image with the received signal value. In other words, the signal value substitution unit 105 uses the signal value substitution pattern that was acquired by the pattern matching unit 103 and sets the signal values of the image after the resolution of the inputted image has been converted to high resolution.

The substitution process above is performed for all of the pixels that require interpolation for resolution conversion, and high-resolution image data that has been converted to the resolution that has been increased i times in the horizontal direction and j times in the vertical direction is outputted from a high-resolution image data output unit 106.

As described above, first, a signal value pattern (signal value substitution pattern) of a high-resolution image and a signal value pattern (signal value matching pattern) of a low-resolution image that was obtained by converting the high-resolution image to the low-resolution image are associated and stored in the low/high-resolution pattern association storage unit 104. Then, when converting the inputted image to high resolution, a signal value matching pattern that coincides with or is the same as a signal value pattern of an image in a predetermined area in the inputted image is searched for in the low/high-resolution pattern association storage unit 104. Then by using a signal value substitution pattern that is associated with the signal value matching pattern that was obtained from the search, the signal values for a high-resolution image after resolution conversion are set.

In this way, an interpolation method such as nearest neighbor interpolation, bi-linear interpolation, bi-cubic interpolation or the like is not used for the interpolation process in the conversion process to a high-resolution image, so the image degradation that results due to these methods does not occur. In other words, with the processing of this embodiment, it is possible to reduce jaggedness or blurring that occurs when performing the resolution conversion from a low-resolution image to a high-resolution image.

Figure 2:
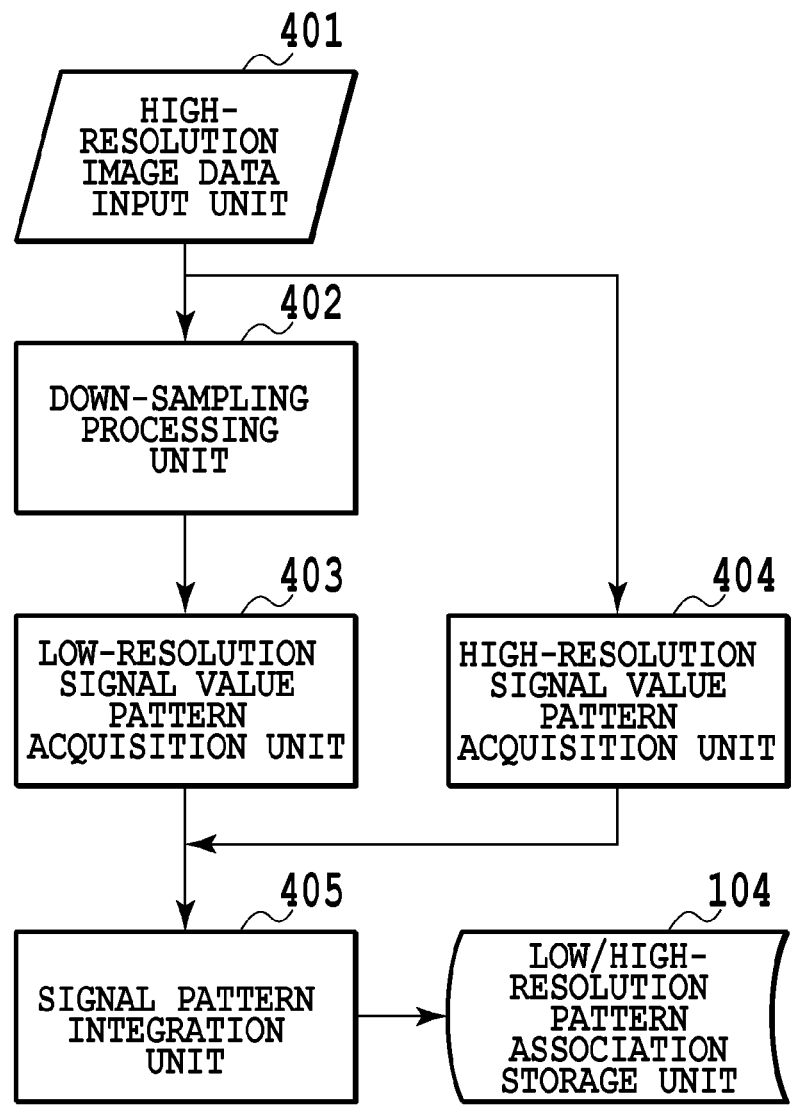
FIG. 2 is a block diagram illustrating a configuration of the functions for creating patterns that are stored in a low/high-resolution pattern association storage unit in the first embodiment.

FIG. 2 is a block diagram illustrating an example of the processing configuration for generating a signal value matching pattern and a multi-gradation signal value substitution pattern that is associated with that signal value matching pattern that are stored in the low/high-resolution pattern association storage unit 104 illustrated in FIG. 1. After once creating matching patterns, they can be used for other images as well, so a matching pattern does not have to be created for each resolution conversion. Here, an example is given for creating a matching pattern when performing resolution conversion that increases the image resolution i times in the horizontal direction and j times in the vertical direction.

A high-resolution image data input unit 401 is an input unit to which a high-resolution image is inputted. A down-sampling processing unit 402 performs down sampling of the resolution of the image inputted from the high-resolution image data input unit 401 to a resolution that is 1/i times in the horizontal direction and 1/j times in the vertical direction. Moreover, the down-sampling process is repeated multiple times using a plurality of different magnification rates for one inputted image.

A low-resolution signal value pattern acquisition unit 403 acquires signal values for N×M pixels acquired from the low-resolution image that was acquired by the down-sampling process, as a signal value matching pattern. The size of the signal value matching pattern acquired is arbitrary, however, by acquiring a large sized signal value matching pattern, it is possible to consider a larger area when performing the resolution conversion described later. When taking into consideration the effect in a case where the size is increased, the specifications of the CPU, and the like, a size of 2×2 pixels or 4×4 pixels is adequate for the size of a signal value matching pattern.

Moreover, a high-resolution signal value pattern acquisition unit 404 acquires signal values of pixels in a predetermined area of the high-resolution image that was inputted from the high-resolution image data input unit 401 as a signal value substitution pattern. The coordinates of the pixels from which the signal value substitution pattern was acquired are set so that they include all of the pixels that correspond to the pixels from which the signal value matching pattern was acquired by the low-resolution signal value pattern acquisition unit 403. The pixel size of the signal value matching pattern is N×M, however, the pixel size of the signal value substitution pattern is (iN−(i−1))×(jM−(j−1)).

A signal value pattern integration unit 405 associates the plurality of signal value matching patterns and signal value substitution patterns that were acquired by the acquisition units 403 and 404 with each other, then writes and stores the patterns in the low/high-resolution pattern association storage unit 104.

By using the image acquired from a high-resolution scanner or the like for example as the high-resolution image to be used when creating a pattern, it is possible to create a learning pattern in which MTF (Modulation Transfer Function) characteristics of the apparatus when resolution conversion was performed are taken into consideration. By using the pattern that takes into consideration the MTF characteristics of the apparatus, in addition to resolution conversion of an image from a low-resolution scanner, it becomes possible to take into consideration the network load and the like when converting a down sampled image to an image having the same image quality as that acquired by a high-resolution scanner.

Figure 3A:
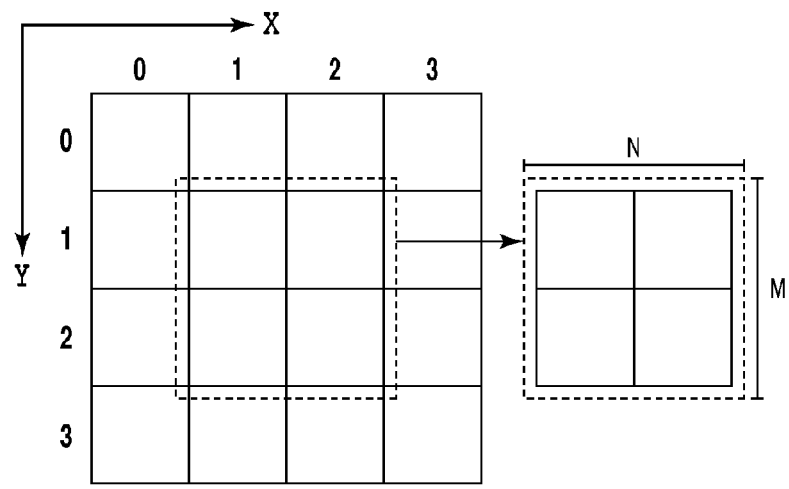
FIGS. 3A and 3B are drawings for explaining in detail the method of creating patterns that are stored in the low/high-resolution pattern association storage unit in the first embodiment.
Figure 3B:
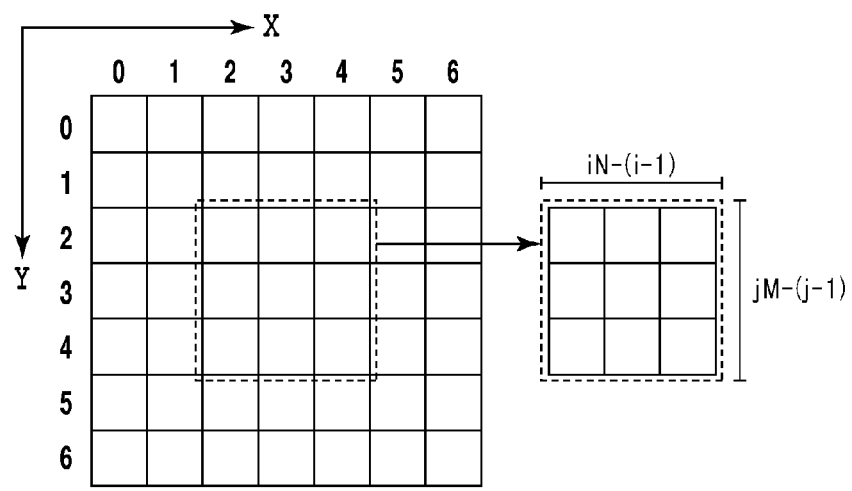

FIG. 3A and FIG. 3B illustrate an example of a signal value matching pattern and a signal value substitution pattern that are stored in the low/high-resolution pattern association storage unit 104.

FIG. 3A illustrates one example of a signal value matching pattern that is acquired from inside a low-resolution image by the low-resolution signal value pattern acquisition unit 403. The signal value matching pattern is formed in an area that is N pixels in the horizontal direction and M pixels in the vertical direction, and is expressed as multi-gradation signal values that were acquired from respective pixels in that area (in this example, N=2 and M=2).

Moreover, FIG. 3B illustrates one example of a signal value substitution pattern that is acquired from inside a high-resolution image by the high-resolution signal value pattern acquisition unit 404. This signal value substitution pattern illustrates a signal value substitution pattern for the same location as the signal matching pattern in FIG. 3A. The signal value substitution pattern is formed in an area that is (iN−(i−1)) pixels in the horizontal direction and (jM−(j−1)) pixels in the vertical direction, and is expressed as multi-gradation signal values that were acquired from respective pixels in this area (in this example, i=2 and j=2).

In order to acquire as many combinations of signal value patterns as possible, combinations of signal value patterns from inside many images are acquired and written in the low/high-resolution pattern association storage unit 104. In a case where there is a combination of signal value matching patterns having the same signal values, the average of the signal value substitution patterns is found and written.

Figure 4:
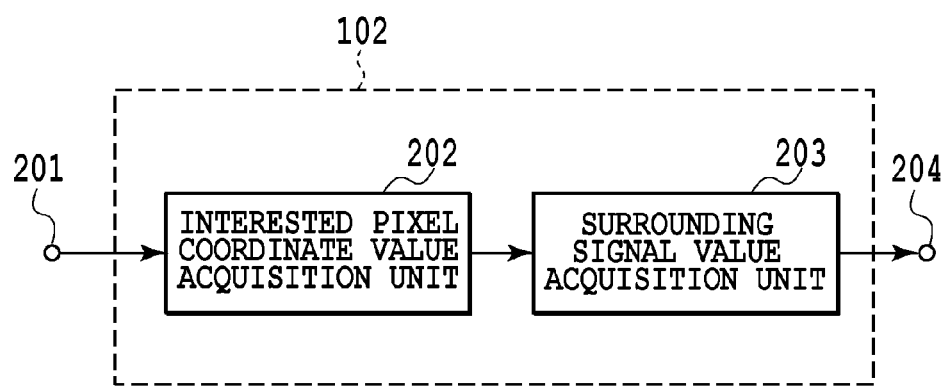
FIG. 4 is a block diagram illustrating a configuration of the function of a signal value acquisition unit in the first embodiment.

FIG. 4 is a drawing that illustrates the detailed configuration of the signal value acquisition unit 102 illustrated in FIG. 1. A low-resolution image is inputted from an input unit 201. An interested pixel coordinate acquisition unit 202 acquires the coordinates of a pixel (pixel of interest) that requires interpolation by the resolution conversion of the inputted low-resolution image. A surrounding signal acquisition unit 203 uses the acquired coordinates of the pixel of interest to form the signal values of the pixels surrounding the pixel of interest into a signal value pattern having a size of N pixels in the horizontal direction and M pixels in the vertical direction. The signal value pattern is outputted from an output unit 204.

Figure 5:
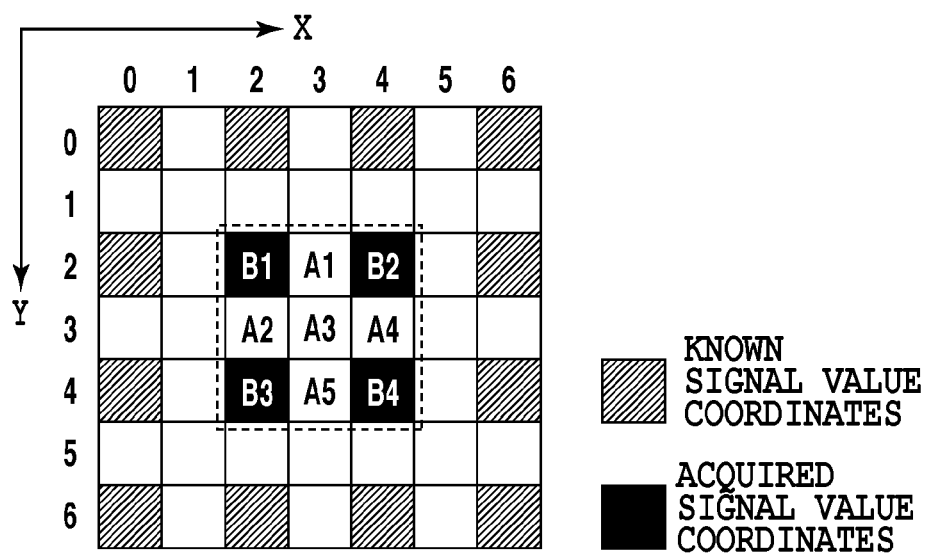
FIG. 5 is a drawing for explaining in detail a pattern that acquires the signal value from a signal value acquisition unit in the first embodiment.

FIG. 5 is a drawing illustrating a signal value pattern that is acquired by the signal value acquisition unit 102 when performing the resolution conversion of this embodiment of image data of a low-resolution image to a resolution that is increased by 2 times in the horizontal direction and 2 times in the vertical direction. When acquiring resolution that is increased by 2 times in the horizontal direction and 2 times in the vertical direction based on the existing signal values (signal values of pixels for which the signal values after resolution conversion are known), which are (X, Y)=(even number, even number), the coordinates of A1 to A5 that require interpolation are acquired by the interested pixel coordinate acquisition unit 202. When doing this, in a case where the matching pattern size in the low/high-resolution pattern association storage unit 104 is 2 pixels in the horizontal direction and 2 pixels in the vertical direction, the surrounding signal acquisition unit 203 acquires signal values for the four pixels B1 to B4 near the respective coordinates of A1 to A5. The acquired signal values are outputted as a signal value pattern for matching.

Figure 6:
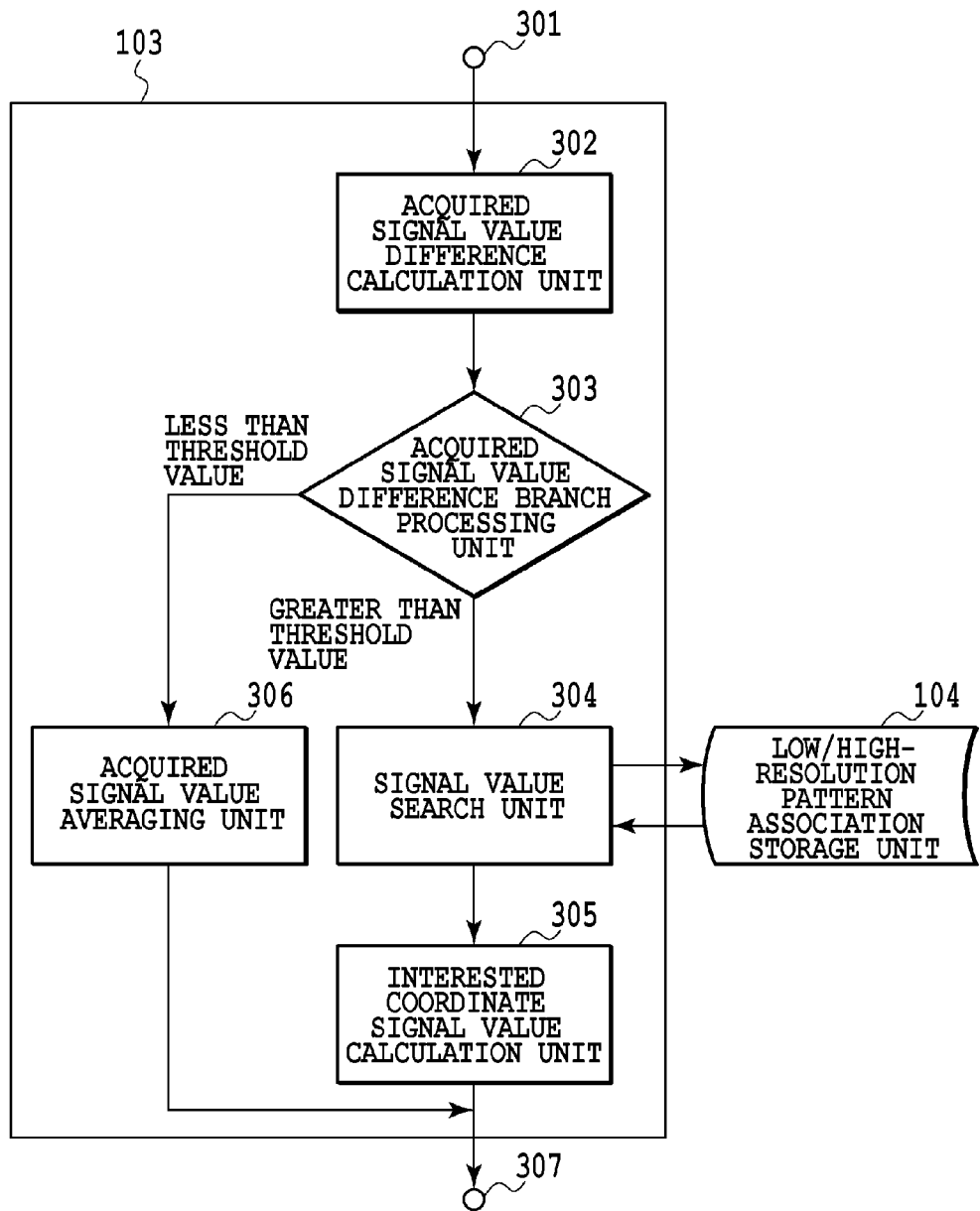
FIG. 6 is a block diagram illustrating a configuration of the functions of a pattern matching unit in the first embodiment.

FIG. 6 is a drawing that illustrates the detailed configuration of the pattern matching unit 103 that is illustrated in FIG. 1. The pattern matching unit 103 checks whether or not pattern matching is necessary, and in a case where pattern matching is necessary, performs matching of the signal value patterns acquired by the signal value acquisition unit 102 and the signal value matching patterns that are stored in the low/high-resolution pattern association storage unit 104.

In this embodiment, first, a signal value pattern (N×M) that was acquired by the signal value acquisition unit 102 is inputted from an input unit 301. An acquired signal value difference calculation unit 302 calculates the differences in the signal values of the respective pixels of the inputted signal value pattern. In FIG. 5, in the case of signal values to be outputted, the differences in the signal values of the four pixels B1 to B4 are calculated.

An acquired signal value difference branch processing unit 303 performs branch processing based on the values calculated by the acquired signal value difference calculation unit 302 and a preset threshold value. In this embodiment, the threshold value is not limited, however, a difference of about ±8 is used as the threshold value. In a case where the acquired signal value difference branch processing unit 303 determines that the difference between signal values is greater than the threshold value, the signal value pattern that was inputted from the input unit 301 is sent to a signal value search unit 304 in order to perform the pattern matching process.

The signal value search unit 304 searches the low/high-resolution pattern association storage unit 104 for and acquires a signal value substitution pattern that is associated with a signal value matching pattern that coincides with the received signal value pattern. Determining that the received signal value pattern matches a signal value matching pattern is not just when the patterns completely coincide, but can also include the case when the difference in signal values is within a predetermined threshold value. The signal value search unit 304 sends the acquired signal value substitution pattern to an interested pixel signal value calculation unit 305.

The interested pixel signal value calculation unit 305 uses the coordinates acquired by the interested pixel coordinate acquisition unit 202, and outputs the signal values of respective pixels of interest in the received signal value substitution pattern from an output unit 307.

In the acquired signal value difference branch processing unit 303, in a case where it is determined that the difference between signal values is less than the preset threshold value, the inputted signal value pattern is an image of ground or the like, so it is determined that it is not necessary to perform detailed resolution conversion, and pattern matching is not performed. Therefore, the acquired signal value pattern is sent to an acquired signal value averaging unit 306.

The acquired signal value averaging unit 306 calculates the average of the signal values of the pixels of the received signal value pattern that surround the pixel of interest, and outputs the calculation result from the output unit 307 as the signal value of the pixel of interest. Here, instead of the averaging process by the acquired signal value averaging unit 306, it is also possible to perform an up-sampling process such as zeroth order interpolation (nearest neighbor method), bi-linear interpolation (bi-linear method) or cubic convolution interpolation (cubic method).

The signal value of the pixel of interest outputted by the pattern matching unit 103 is used as a signal value for substitution in the signal value substitution unit 105.

In this way, with processing illustrated in FIG. 6, the pattern matching process is only performed in a case where the acquired signal value difference branch processing unit 303 determines that the difference between signal values is greater than the threshold value, so the matching process is not performed for signal value patterns for which high-precision resolution conversion is not necessary. As a result, it is possible to reduce the amount of signal value patterns that must be stored in advance in the low/high-resolution pattern association storage unit 104, and thus it is possible to suppress the capacity of the low/high-resolution pattern association storage unit 104.

FIGS. 7A to 7F are conceptual drawings illustrating the signal value acquisition process by the signal value acquisition unit 102, the matching process by the pattern matching unit 103, and the signal value substitution process by the signal value substitution unit 105. Referring to FIGS. 7A to 7F, the flow of the series of processes for performing resolution conversion to increase the resolution by 2 times in the horizontal direction and 2 times in vertical direction using a matching pattern that is 2 pixels in the horizontal direction and 2 pixels in vertical direction is explained.

Figure 7D:
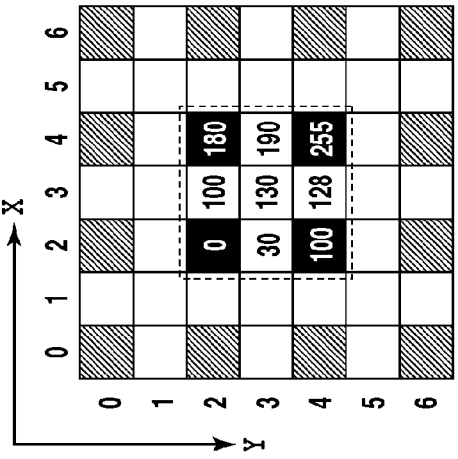
FIGS. 7A to 7F are drawings for explaining in detail the processing by the signal acquisition unit, pattern matching unit, low/high-resolution pattern association storage unit and signal value substitution unit in the first embodiment.
Figure 7F:
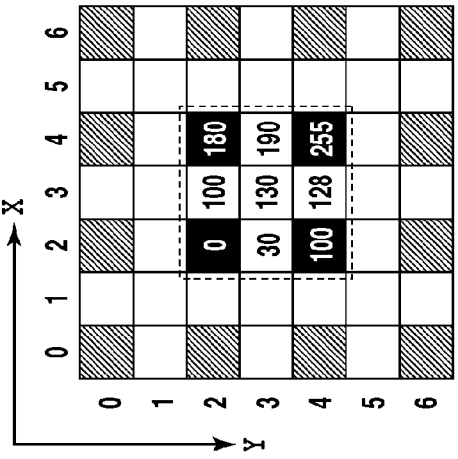
Figure 7C:
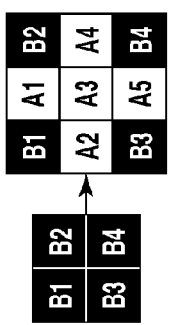
Figure 7E:
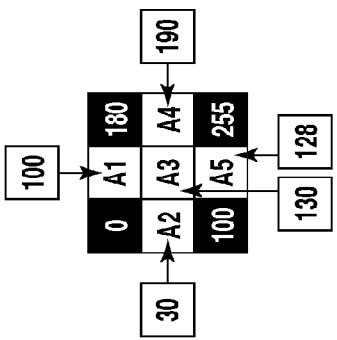
Figure 7A:
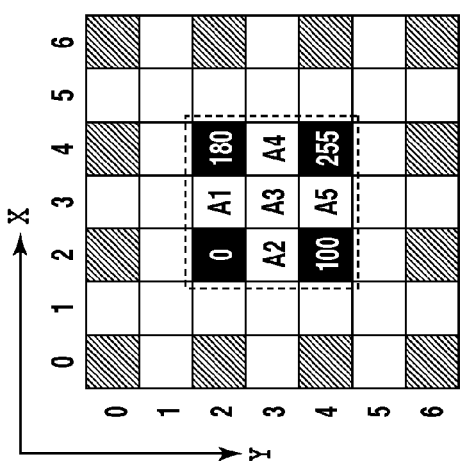

FIG. 7A illustrates an example of a multi-gradation image for which the signal values are known for the pixels (X, Y)=(even number, even number). The unknown signal values for the pixels indicated by A1 to A5 are interpolated based on the known signal values.

Figure 7B:
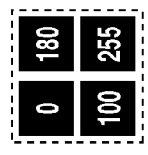

In order to perform the interpolation of the pixels indicated by A1 to A5 as pixels of interest, the signal values of the pixels (2×2 pixels=4 pixels) having known signal values that exist around the pixels of interest are acquired as illustrated in FIG. 7B by the processing by the signal value acquisition unit 102 based on the coordinates of the pixels of interest. The acquired signal values of the respective pixels are inputted to the pattern matching unit 103 as a signal value pattern.

In the pattern matching unit 103, the matching process is performed using the low/high-resolution pattern association storage unit 104. As illustrated in FIG. 7C, a high-resolution signal value substitution pattern that is associated with a low-resolution signal value matching pattern including B1 to B4 is stored in the low/high-resolution pattern association storage unit 104. Moreover, the signal values for the pixels A1 to A5 inside the signal value substitution pattern are also stored inside the low/high-resolution pattern association storage unit 104.

FIG. 7D illustrates an example of the matching process. The pattern matching unit 103 searches the low/high-resolution pattern association storage unit 104 for a signal value substitution pattern that is associated with the signal value matching pattern that coincides with the signal value pattern in FIG. 7B.

As illustrated in FIG. 7E, the pattern matching unit 103 extracts the signal values for the pixels of interest, A1 to A5 from the signal value substitution pattern that was obtained from the search. As illustrated in FIG. 7F, the signal value substitution unit 105 substitutes the signal values of the coordinates of interest with the extracted signal values.

In this way, the signal values other than those of known signal value coordinates are substituted with the signal values extracted from the signal value substitution pattern. Moreover, other signal values (at least part of the signal values) are used as signal values of the image after high-resolution conversion of the signal values of the input image. By substituting only the signal values other than those of the known signal value coordinates with the signal values that were extracted from the signal value substitution pattern, it is possible to improve the processing speed. It is also possible to perform processing of interpolating the known signal values as well by extracting signal values of all of the pixels of the signal value substitution pattern illustrated in FIG. 7E and substituting the signal values for all of the pixels illustrated in FIG. 7F.

By performing the process explained with reference to FIGS. 7A to 7F on a low-resolution image, it is possible to output high-resolution image data from the high-resolution image data output unit 106.

Figure 8:
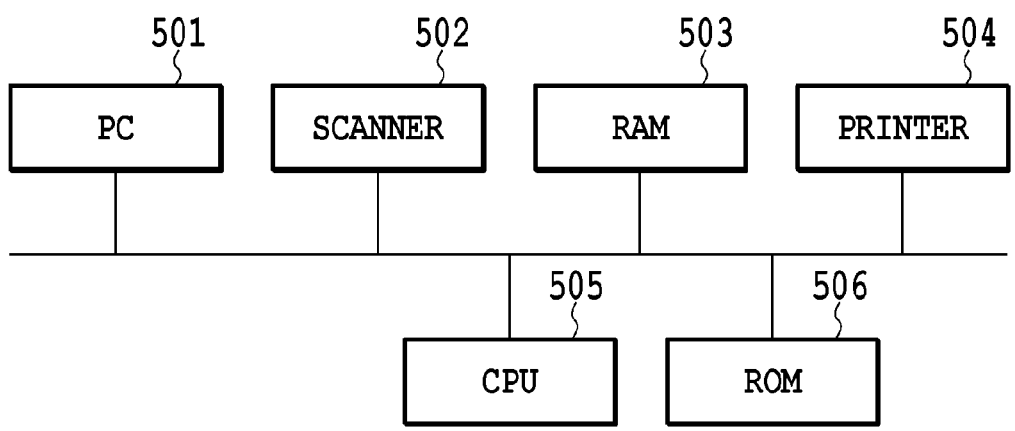
FIG. 8 is a drawing for explaining a hardware configuration in the first embodiment.

FIG. 8 illustrates the hardware configuration of an image-processing apparatus (image-processing system) for executing the image processing method explained above. Image data for which image processing is performed is acquired from a PC 501 or a scanner 502. The acquired image data is stored in a RAM 503. A CPU 505 controls the overall processing that is performed by this image-processing apparatus. A ROM 506 is a storage unit where programs controlled by the CPU 505 and low-resolution and high-resolution patterns are stored. An image for which the program is executed by the CPU 505 to perform resolution conversion is outputted from a printer 504.

The hardware configuration described above for the image-processing apparatus is only one example, and is not limited to this. For example, the configuration can further include a communication unit for inputting/outputting image data, or a hard disc for storing various data.

By performing signal value pattern matching based on the inclination of signal values introduced in this embodiment as described above, it becomes possible to use apparatus MTF characteristics that were taken into consideration when creating matching patterns, and perform more detailed resolution conversion.

(Second Embodiment)

In the first embodiment, a method of performing detailed resolution conversion by acquiring one N x M signal value matching pattern from inside a low-resolution image and using pattern matching to perform substitution with an associated high-resolution signal value substitution pattern was explained. By using an N×M pattern size, resolution conversion is possible that takes into consideration a wide range of signal value information, however, instead, the number of stored matching patterns increases, and the capacity of the low/high-resolution pattern association storage unit 104 increases.

Moreover, pattern matching that is used in interpolation can be performed only once, however, depending on the pattern used, there is a possibility that a large signal value difference will occur between neighboring coordinates, especially it is possible to see a zigzag like pattern on the edges. Therefore, in a second embodiment, a configuration is explained wherein under the condition that the size of the matching pattern is made narrower, and the capacity of the low/high-resolution pattern unit 104 is reduced, in addition to the same effects, the edge sections are changed to smooth signal values, and it is possible to achieve more natural image formation.

Figure 9:
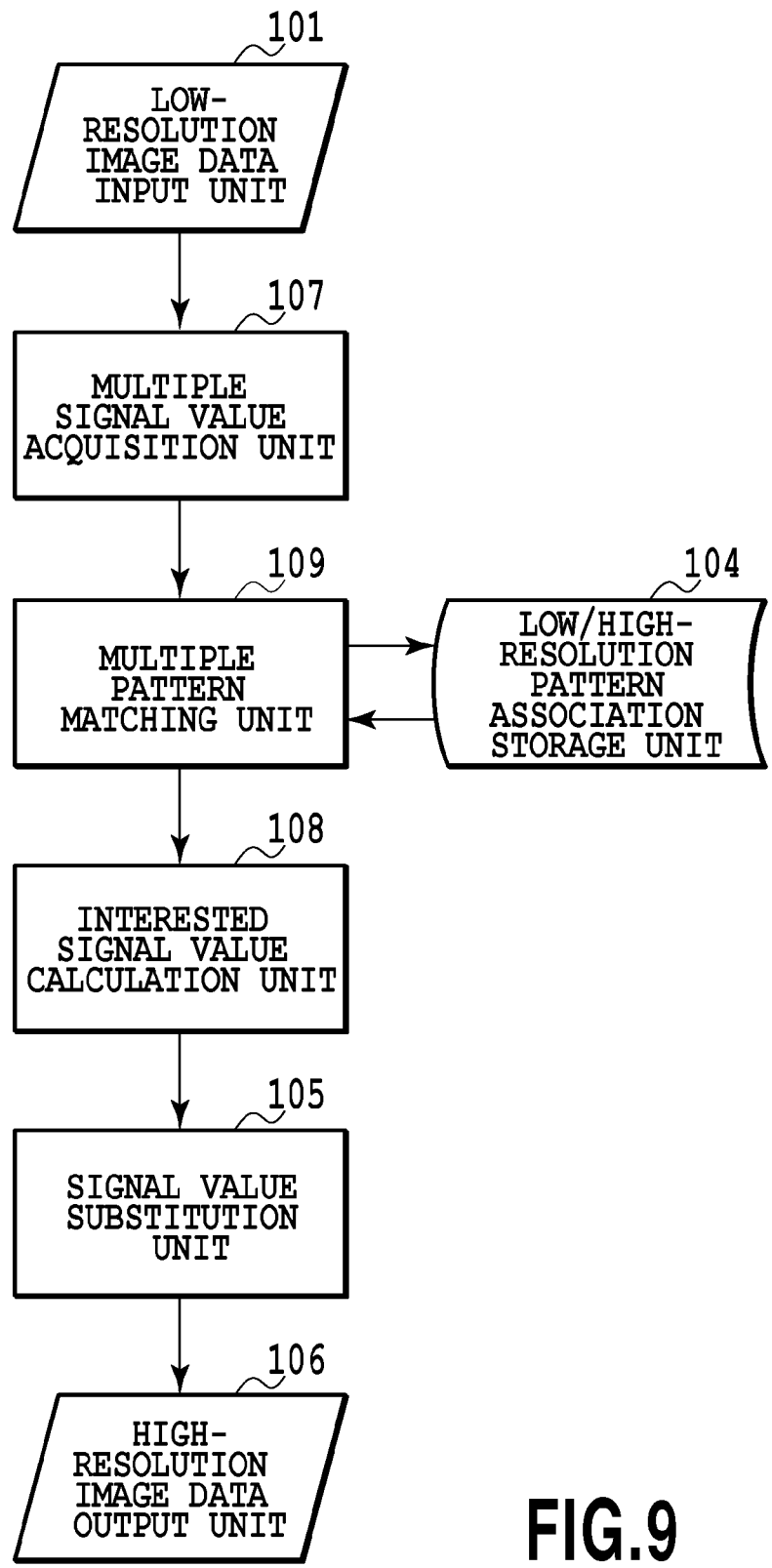
FIG. 9 is a block diagram illustrating a schematic configuration of the functions for executing the processing of a second embodiment.

FIG. 9 illustrates a schematic functional configuration of processing in the second embodiment of the present invention. In FIG. 9, the same reference numbers are given to parts that have the same configurations as in the first embodiment illustrated in FIG. 1 described above. FIG. 9 illustrates a low-resolution image data input unit 101, a multiple signal value acquisition unit 107, a multiple pattern matching unit 109, a low/high-resolution pattern association storage unit 104, an interested signal value calculation unit 108, a signal value substitution unit 105, and a high-resolution image data output unit 106.

In this embodiment, an example of processing for performing resolution conversion by a different configuration than in the first embodiment illustrated in FIG. 1 will be explained. In other words, an example of processing for performing resolution conversion wherein the multiple signal value acquisition unit 107, multiple pattern matching unit 109 and interested signal value calculation unit 108 use a matching pattern having 3×1 pixels (3 pixels) to increase the resolution two times in the horizontal direction and two times in the vertical direction.

Figure 10:
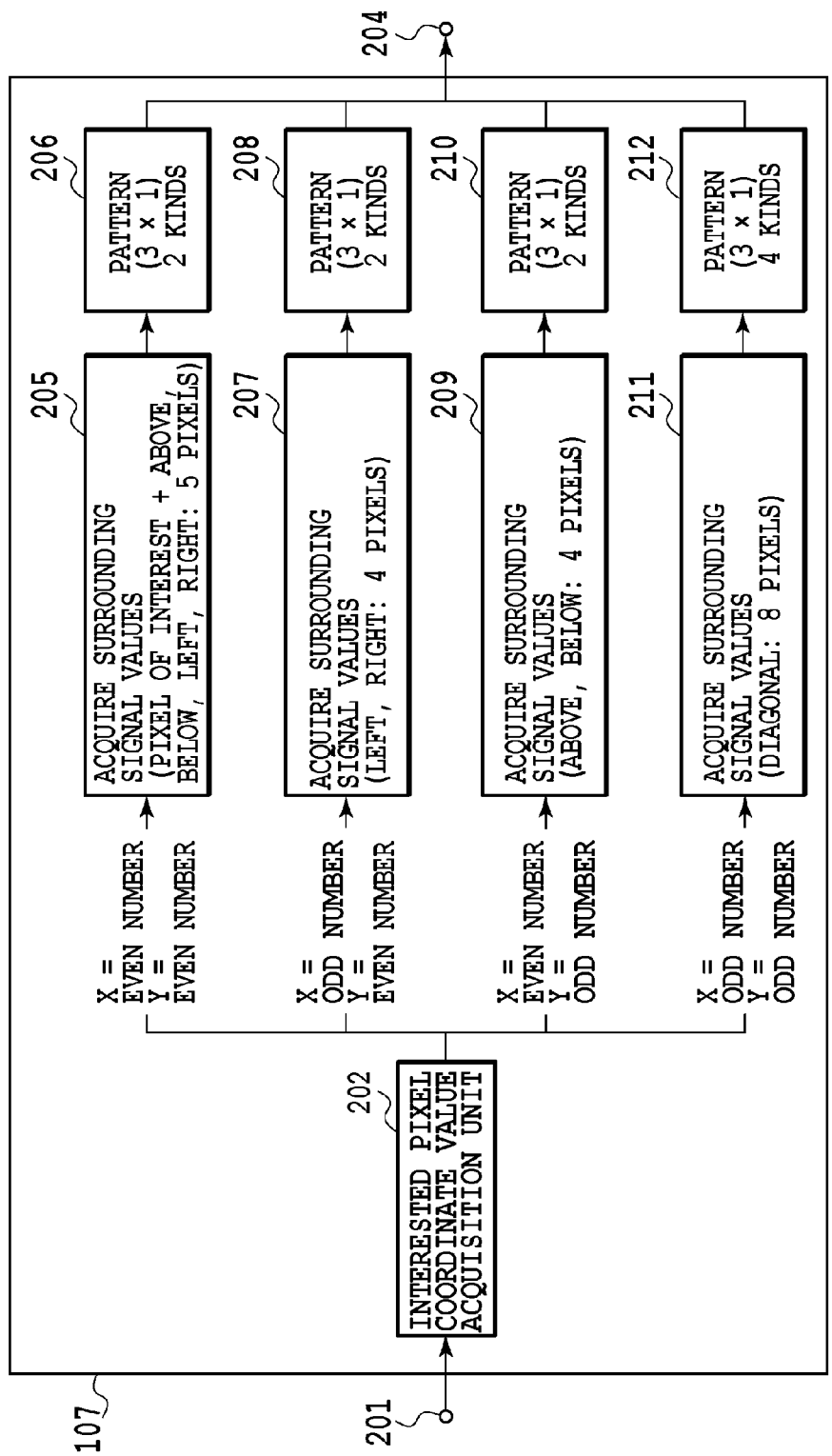
FIG. 10 is a block diagram illustrating a configuration of the functions of a multiple signal value acquisition unit in the second embodiment.

FIG. 10 is a drawing that illustrates a detailed configuration of the multiple signal value acquisition unit 107 illustrated in FIG. 9. The same reference numbers are given to parts that are the same as in the first embodiment illustrated in FIG. 4 described above. In this embodiment, a low-resolution image is inputted by an input unit 201, and an interested pixel coordinate acquisition unit 202 acquires the coordinates after resolution conversion. Processing is branched according to whether the pixel coordinates of interest acquired by the interested pixel coordinate acquire 202 are even numbers or odd numbers.

When the pixel coordinates of interest are (X, Y)=(even number, even number), the signal values of five pixels that include the pixel of interest and the pixels above, below, to the left and right are acquired in the step indicated by reference number 205. Two kinds of signal value patterns having 3×1 pixels (3 pixels) are formed in the step indicated by reference number 206 from the acquired signal values of the 5 pixels, and the patterns are outputted from an output unit 204.

When the pixel coordinates of interest are (X, Y)=(odd number, even number), the signal values of four pixels on the left and right of the pixel of interest are acquired in the step indicated by reference number 207. Two kinds of signal value patterns having 3×1 pixels (3 pixels) are formed in the step indicated by reference number 208 from the acquired signal values of the 4 pixels, and the patterns are outputted from the output unit 204.

When the pixel coordinates of interest are (X, Y)=(even number, odd number), the signal values of four pixels above and below the pixel of interest are acquired in the step indicated by reference number 209. Two kinds of signal value patterns having 3×1 pixels (3 pixels) are formed in the step indicated by reference number 210 from the acquired signal values of the 4 pixels, and the patterns are outputted from the output unit 204.

When the pixel coordinates of interest are (X, Y)=(odd number, odd number), the signal values of eight pixels that diagonally surround the pixel of interest are acquired in the step indicated by reference number 211. Four kinds of signal value patterns having 3×1 pixels (3 pixels) are formed in the step indicated by reference number 212 from the acquired signal values of the 8 pixels, and the patterns are outputted from the output unit 204.

FIGS. 11A to 11D are drawings that illustrate examples of signal value patterns that are formed and outputted by the multiple signal value acquisition unit 107 in FIG. 10. FIGS. 11A to 11D illustrate an example of a multi-gradation low-resolution image, where the signal values of pixels (X, Y)= (even number, even number) are known. Other signal values are interpolated based on the known low-resolution signal values. The acquired matching patterns are classified into four kinds according to the X and Y coordinates of the pixel coordinate values of interest.

FIG. 11A corresponds to the case where the pixel coordinates of interest are (X, Y)=(even number, even number). The signal values of the five pixels that include the pixel of interest and the pixels above, below, to the left and right are acquired, and the two kinds of signal value patterns having 3×1 pixels (3 pixels) are formed as indicated by the dashed lines from the acquired signal values of the five pixels. In other words, in the case illustrated in FIG. 11A, there are the two kinds of signal value patterns, i.e., a pattern illustrated by A1, A3 and A5, and a pattern illustrated by A2, A3 and A4.

FIG. 11B corresponds to the case where the pixel coordinates of interest are (X, Y)=(odd number, even number). The signal values of the four pixels on the left and right of the pixel of interest are acquired, and the two kinds of signal value patterns having 3×1 pixels (3 pixels) are formed as indicated by the dashed lines from the acquired signal values of the four pixels. In other words, in the case illustrated in FIG. 11B, there are the two kinds of signal value patterns, i.e., a pattern illustrated by A1, A2 and A3, and a pattern illustrated by A2, A3 and A4.

FIG. 11C corresponds to the case where the pixel coordinates of interest are (X, Y)=(even number, odd number). The signal values of the four pixels above and below the pixel of interest are acquired, and the two kinds of signal value patterns having 3×1 pixels (3 pixels) are formed as indicated by the dashed lines from the acquired signal values of the four pixels. In other words, in the case illustrated in FIG. 11C, there are the two kinds of signal value patterns, i.e., a pattern illustrated by A1, A2 and A3, and a pattern illustrated by A2, A3 and A4.

FIG. 11D corresponds to the case where the pixel coordinates of interest are (X, Y)=(odd number, odd number). The signal values of the eight pixels that diagonally surround the pixel of interest are acquired, and the four kinds of signal value patterns having 3×1 pixels (3 pixels) are formed as indicated by the dashed lines from the acquired signal values of the eights pixels. In other words, in the case illustrated in FIG. 11D, there are the four kinds of signal value patterns, i.e., a pattern illustrated by A1, A2 and A3, a pattern illustrated by A2, A3 and A4, a pattern indicated by A5, A6 and A7, and a pattern indicated by A6, A7 and A8.

The combinations of multiple kinds of patterns illustrated here are not limiting, and for example, in the case of FIG. 11D, instead of the four kinds of signal value patterns, it is possible to use only two kinds of patterns, i.e., a pattern illustrated by A1, A2 and A3, and a pattern illustrated by A2, A3 and A4.

The multiple signal value patterns that are outputted from the multiple signal value acquisition unit 107 are sent to the multiple pattern matching unit 109. The multiple pattern matching unit 109 uses the multiple received signal value patterns to search for a signal value matching pattern, and sends the associated multiple signal value substitution patterns to the interested signal value calculation unit 108.

In the interested signal value calculation unit 109, signal values that correspond to the respective pixels of interest are extracted from the multiple inputted signal value substitution patterns, and the average is then calculated and sent to the signal value substitution unit 105 as interested pixel signal values. The signal value substitution unit 105 substitutes the signal values of the pixels that are object of interpolation with the signal values of the pixels of interest received from the interested signal value calculation unit 108. In other words, in this embodiment, multiple signal value substitution patterns are used in order to set the signal value of one pixel in a high-resolution image.

FIGS. 12A to 12H are drawings illustrating the signal value acquisition process by the multiple signal value acquisition unit 107, the matching process by the multiple pattern matching unit 109, the averaging process by the interested signal value calculation unit 108 and the signal value substitution process by the signal value substitution unit 105.

FIG. 12A illustrates an example of a multi-gradation image where (X, Y)=(even number, even number) are known signal values, and an unknown signal value that is indicated by the circle mark is interpolated based on the known signal values. When performing the interpolation of a pixel indicted by the circle mark in FIG. 12A as a pixel of interest, in branch processing by the multiple signal value acquisition unit 107, the coordinates of the pixel of interest are (X, Y)=(odd number, even number). Therefore, the signal values of the four pixels on the left and right of the pixel of interest are acquired as illustrated in FIG. 12B. Two kinds of signal value patterns having 3×1 pixels (3 pixels) are formed as illustrated in FIGS. 12C and 12D from the acquired signal values, and the signal value patterns are inputted to the multiple pattern matching unit 109.

FIG. 12E illustrates an example of a signal value matching pattern that is stored beforehand in the low/high-resolution pattern association storage unit 104, and a multi-gradation signal value substitution pattern that is associated with the signal value matching pattern. Signal value matching patterns that coincide with the signal value patterns in FIG. 12C and FIG. 12D are searched for from inside the multi-gradation signal value matching pattern illustrated in FIG. 12E. A signal value that corresponds to the pixel of interest is acquired from among the signal values of the signal substitution pattern that is associated with the obtained signal value matching pattern.

FIG. 12F illustrates the signal value of the pixel of interest that was obtained from searching the signal value pattern in FIG. 12C, and FIG. 12G illustrates the signal value of the pixel of interest that was obtained from searching the signal value pattern in FIG. 12D. The signal values that were acquired by the multiple pattern matching unit 109 are sent to the interested signal value calculation unit 108, and the interested signal value calculation unit 108 averages the multiple signal values of the coordinates corresponding to the coordinates of interest. As illustrated in FIG. 12H, the signal value substitution unit 105 substitutes of the signal value of the coordinates of interest with the calculated average value. In this way, in this embodiment, multiple signal value substitution patterns are used in order to set the signal value for one pixel in an image for which the resolution is converted.

By performing the processing from that of the signal value acquisition unit 107 to that of the signal value substitution unit 105 for all pixels for which resolution conversion is performed using the method described above, the result is outputted from the high-resolution image data output unit 106 as high-resolution image data.

Moreover, in this embodiment, the size of the signal value matching pattern was illustrated as 3×1 pixels (3 pixels), however, as illustrated in FIGS. 13A to 13D, it is also possible to perform matching with a small N×M size such as 2×2 pixels (4 pixels). FIGS. 13A to 13D are similar to FIGS. 11A to 11D and illustrate an example of a multi-gradation low-resolution image, where the signal values of the pixels (X, Y)=(even number, even number) are known. The other signal values are interpolated based on the known low-resolution signal values. The signal value patterns acquired from a low-resolution image are classified into four types according to the X and Y coordinates of the pixel coordinate values of interest.

Figure 13A:
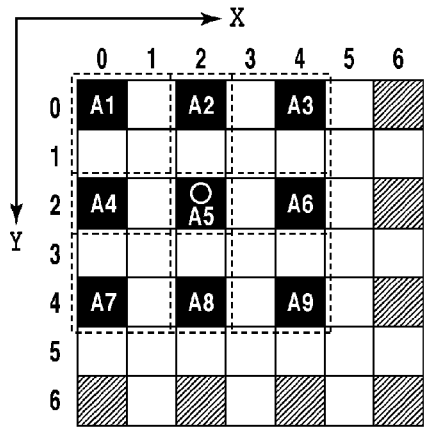
FIGS. 13A to 13D are drawings for explaining in detail patterns that acquire signal values from the multiple signal value acquisition unit in the second embodiment.

In FIG. 13A, the pixel coordinates of interest correspond to when (X, Y)=(even number, even number). The signal values for 9 pixels, which include the pixel of interest and the pixels that are above, below, to the left, to the right and diagonal from the pixel of interest, are acquired, and four kinds of signal value patterns having 2×2 pixels (4 pixels) indicated by the dashed lines are formed from the acquired pixels and outputted. In other words, in the case of FIG. 13A, the four kinds of signal value patterns are the pattern indicated by A1, A2, A4 and A5, the pattern indicated by A2, A3, A5 and A6, the pattern indicated by A4, A5, A7 and A8, and the pattern indicated by A5, A6, A8 and A9. In the example in FIG. 13A, the pixel coordinates of interest (or in other words, the coordinates that are the object of interpolation) are known signal value coordinates, however, instead of using the know signal value coordinates as coordinates that are the object of interpolation, they can be used as the signal values after high-resolution conversion. In doing so, it is possible to reduce the number of pixels that are the object of interpolation, and thus it is possible to improve the processing speed.

Figure 13B:
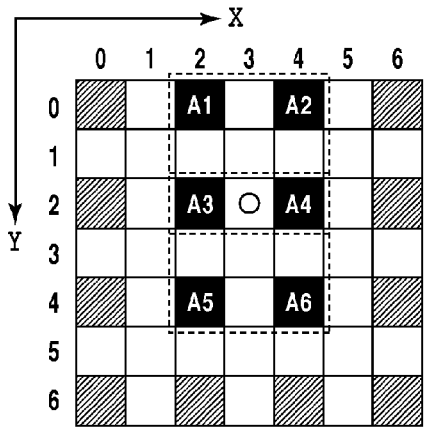

In FIG. 13B, the pixel coordinates of interest correspond to when (X, Y)=(odd number, even number). The signal values for 6 pixels around the pixel of interest are acquired, and two kinds of signal value patterns having 2×2 pixels (4 pixels)

indicated by the dashed lines are formed from the acquired pixels and outputted. In other words, in the case of FIG. 13B, the two kinds of signal value patterns are the pattern indicated by A1, A2, A3 and A4, and the pattern indicated by A3, A4, A5 and A6.

Figure 13C:
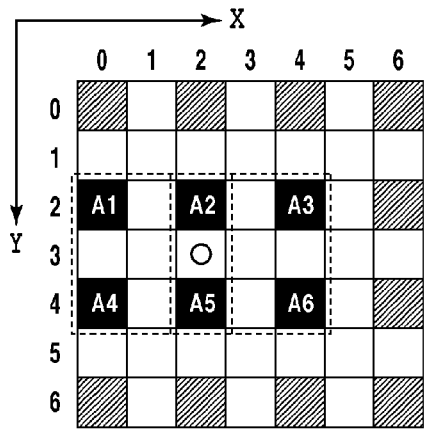

In FIG. 13C, the pixel coordinates of interest correspond to when (X, Y)=(even number, odd number). The signal values for 6 pixels around the pixel of interest are acquired, and two kinds of signal value patterns having 2×2 pixels (4 pixels) indicated by the dashed lines are formed from the acquired pixels and outputted. In other words, in the case of FIG. 13C, the two kinds of signal value patterns are the pattern indicated by A1, A2, A4 and A5, and the pattern indicated by A2, A3, A5 and A6.

Figure 13D:
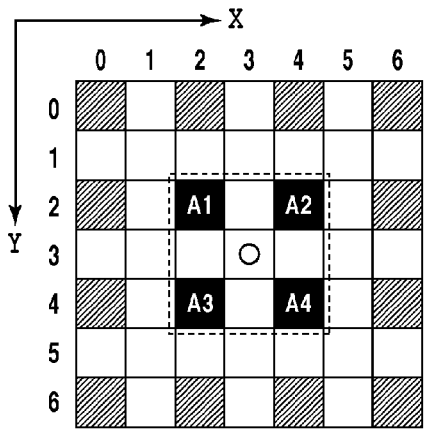

In FIG. 13D, the pixel coordinates of interest correspond to when (X, Y)=(odd number, odd number). The signal values for 4 pixels around the pixel of interest are acquired, and one kind of signal value pattern having 2×2 pixels (4 pixels) indicated by the dashed line is formed from the acquired pixels and outputted. In other words, in the case of FIG. 13D, the one kind of signal value pattern is the pattern indicated by A1, A2, A3 and A4.

The plurality of kinds of pattern combinations illustrated here are not limiting, and for example, instead of the four types of signal value patterns in the case in FIG. 13A, it is also possible to have only two types of patterns that include the pattern indicated by A1, A2, A4 and A5, and the pattern indicated by A5, A6, A8 and A9. Alternatively, it is also possible to have only two types of patterns that include the pattern indicated by A2, A3, A5 and A6, and the pattern indicated by A4, A5, A7 and A8.

Pattern matching is performed using the acquired multiple N×M signal value patterns. By performing matching by N×M sized patterns such as 2×2 pixels (4 pixels), the number of patterns increases, however, in resolution conversion, recovery is possible that has smoother image quality.

As described above, the reason for acquiring multiple matching patterns, and performing matching multiple times is because the size of the patterns is made smaller in order to reduce memory resources. When a multi-gradation pattern is maintained at a large size, there are an enormous number of patterns, so in this embodiment, a reduction in memory resources is performed by making the pattern size small. However, by making the pattern size small, signal values over a wide range are not taken into consideration, and it is not possible to perform detailed resolution conversion, however, by performing matching with sliding the matching pattern, virtually the same effect is obtained as when performing pattern matching using a large pattern.

Moreover, by performing matching multiple times using multiple patterns, it is also possible to reduce a zigzag like pattern on the edge sections, which is a concern of performing pattern matching one time, and thus more natural edge recovery is achieved.

(Third Embodiment)

In the first embodiment and the second embodiment, methods were explained in which detailed resolution conversion is performed by acquiring N x M signal value matching patterns from inside a low-resolution image for all of the pixels in the image, and using the pattern matching to perform substitution with an associated high-resolution signal value substitution pattern. However, locations where image degradation easily occurs when performing resolution conversion is limited to text sections or edge sections, and in locations where there is a low need for detailed recovery such as where the signal values change gently, there is no need to perform detailed recovery with this method. Therefore, in this third embodiment, a configuration is explained wherein attributes of the image are determined before performing resolution conversion, and the method used for resolution conversion is changed according to the attributes, thus making it possible to reduce the processing time.

Figure 14:
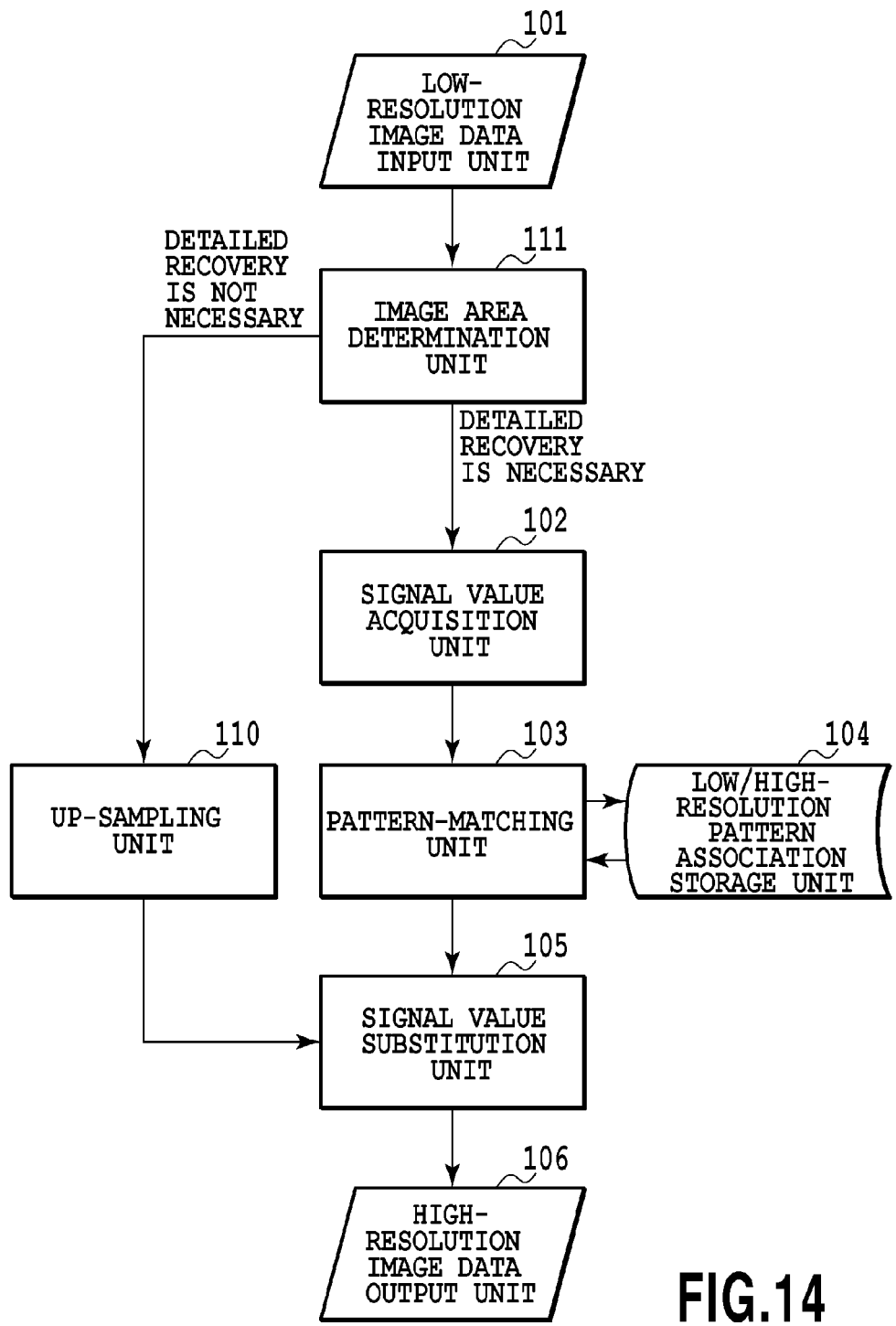
FIG. 14 is a block diagram illustrating a schematic configuration of the functions for executing the processing of a third embodiment.

FIG. 14 illustrates a schematic functional configuration of this third embodiment of the present invention. In FIG. 14, the same reference numbers are given to parts that are the same as those illustrated in FIG. 1 of the first embodiment described above. In this schematic functional configuration, the low-resolution image data input unit 101, the signal value acquisition unit 102, the pattern matching unit 103, the low/high-resolution pattern association storage unit 104, the signal value substitution unit 105, and the high-resolution image data output unit 106 are illustrated similarly to the configuration illustrated in FIG. 1. Furthermore, in addition to these, an image area determination unit 111, and an up-sampling unit 110 are illustrated.

The image area determination unit 111 acquires on a pixel basis attributes of pixels of interest in an image that was inputted from the low-resolution image data input unit 101, and determines according to the acquired attributes whether or not it is necessary to perform detailed recovery using resolution conversion. In a case where the input image is an image wherein the signal values suddenly change, such as in text sections or edge sections, the image area determination unit 111 determines that the detailed recovery using resolution conversion is necessary. In other words, the image area determination unit 111, according to the difference in signal values of pixels inside the inputted image, determines whether or not the detailed recovery using resolution conversion is necessary. Whether or not there are sudden changes in signal values in the image may be determined by whether or not the difference in the maximum signal value and minimum signal value inside the inputted image exceeds a predetermined value.

In a case where it is determined that the detailed recovery of the inputted image is necessary, the image area determination unit 111 sends the surrounding signal values around the pixel of interest to the signal value acquisition unit 102. The signal values surrounding the pixel of interest are acquired, matching is performed by the pattern matching unit 103, the signal value of the pixel of interest is calculated, and the result is sent to the signal value substitution unit 105.

In a case where it is determined that the detailed recovery of the inputted image is not necessary (in other words, the signal values of the pixels change gently), the image area determination unit 111 sends the signal values of the inputted image to the up-sampling unit 110.

The up-sampling unit 110 calculates the signal value of the pixel of interest after up-sampling by an interpolation method such as nearest neighbor interpolation or bi-linear interpolation that have a low processing load, or bi-cubic interpolation or the like, and sends the result to the signal value substitution unit 105.

With this third embodiment, it is possible to selectively perform resolution conversion according to the image attributes when performing the resolution conversion of an inputted image from low resolution to high resolution. Moreover, for locations inside the image where the signal values change gently and do not need the detailed recovery, an interpolation method that has little processing load is used, so it is possible to also reduce the processing time. Furthermore, in this embodiment, as in the first embodiment of resolution conversion using pattern matching, an example of the pattern matching unit 103 performing pattern matching one time was given. However, as in the second embodiment, it is also possible to respectively change the signal value acquisition unit 102 and pattern matching unit 103 to a multiple signal value acquisition unit 107 and multiple pattern matching unit 109, and add an interested signal value calculation unit in order to perform resolution conversion by performing matching multiple times.

(Other Embodiments)

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer, for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-249586, filed Nov. 15, 2011, which is hereby incorporated by reference herein in its entirety.

What is claimed is:

1. An image processing apparatus, comprising:
a storage unit configured to associate and store a signal value pattern of a high-resolution image and a signal value pattern of a low-resolution image that has been converted to a low resolution from the high-resolution image;
an acquisition unit configured to, according to a result of matching a signal value pattern of an inputted image with the signal value pattern of the low-resolution image, acquire the signal value pattern of the high-resolution image that is associated with the signal value pattern of the low-resolution image from the storage unit; and
a setting unit configured to use the signal value pattern acquired by the acquisition unit, to set signal values of an image after high-resolution conversion of the inputted image.

2. The image processing apparatus according to claim 1, wherein
the setting unit is configured to set the signal values of the inputted image as at least part of signal values of the image after the high-resolution conversion.

3. The image processing apparatus according to claim 1, wherein
the storage unit is configured to store more than one signal value substitution patterns having different resolutions that have been associated with one signal value matching pattern.

4. The image processing apparatus according to claim 3, wherein
the acquisition unit is configured to, according to an enlargement rate of the high-resolution conversion, acquire the signal value pattern of the high-resolution image from the storage unit.

5. The image processing apparatus according to claim 1, wherein
the setting unit is configured to, in order to set a signal value of one pixel of the image after the high-resolution conversion, use more than one signal value patterns acquired by the acquisition unit.

6. The image processing apparatus according to claim 1, wherein
the setting unit is configured to use the signal value pattern acquired by the acquisition unit to set the signal value only in a case where a difference in signal values of pixels inside the inputted image exceeds a predetermined value.

7. An image processing method performed by a apparatus comprising a storage unit configured to associate and store a signal value pattern of a high-resolution image and a signal value pattern of a low-resolution image which has been converted to low resolution from the high-resolution image;
the method comprising:
an acquisition step of, based on a result of matching a signal value pattern of an inputted image with the signal value pattern of the low-resolution image, acquiring the signal value pattern of the high-resolution image that is associated with the signal value pattern of the low-resolution image from the storage unit; and
a setting step of, using the signal value pattern acquired by the acquisition step to set signal values of an image after high-resolution conversion of the inputted image.

8. An image processing apparatus for converting a low-resolution image having a first resolution to a high-resolution image having a second resolution that is higher than the first resolution, comprising:
a comparison unit configured to compare signal values of N×M pixels of the low-resolution image with more than one signal value patterns, wherein N and M are natural numbers;
an acquisition unit configured to acquire more than one signal value patterns that correspond to the signal values of the N×M pixels based on a comparison result of the comparison unit; and
a conversion unit configured to calculate a signal value of one pixel of the high-resolution image by using more than one signal values obtained from the plurality of signal value patterns acquired by the acquisition unit, and based on the calculated signal value, convert the low-resolution image to the high-resolution image.

9. The image processing apparatus according to claim 8, wherein the conversion unit is configured to calculate the signal value of one pixel of the high-resolution image by using an average of the plurality of signal values.

10. An image processing method for converting a low-resolution image having a first resolution to a high-resolution image having a second resolution that is higher than the first resolution, comprising:
a comparison step of comparing signal values of N×M pixels of the low-resolution image with more than one signal value patterns, wherein N and M are natural numbers;
an acquisition step of acquiring more than one signal value patterns that correspond to the signal values of the N×M pixels as a comparison result of the comparison step; and
a conversion step of calculating a signal value of one pixel of the high-resolution image by using more than one signal values obtained from the plurality of signal value patterns acquired by the acquisition step, and based on the calculated signal value, converting the low-resolution image to the high-resolution image.

11. A non-transitory computer-readable recording medium that stores a program for causing a computer to function as the image processing apparatus according to claim 1.

* * * * *